US008407752B2

(12) United States Patent
Levy et al.

(10) Patent No.: US 8,407,752 B2
(45) Date of Patent: Mar. 26, 2013

(54) SYNCHRONIZING BROADCAST CONTENT WITH CORRESPONDING NETWORK CONTENT

(75) Inventors: Kenneth L. Levy, Stevenson, WA (US); Reed R. Stager, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 2884 days.

(21) Appl. No.: 10/804,581

(22) Filed: Mar. 18, 2004

(65) Prior Publication Data

US 2005/0210526 A1    Sep. 22, 2005

(51) Int. Cl.
*H04N 7/173* (2006.01)
*H04N 7/16* (2006.01)

(52) U.S. Cl. .................................. 725/113; 725/135
(58) Field of Classification Search ............... 725/113
See application file for complete search history.

(56) References Cited

U.S. PATENT DOCUMENTS

| | | | |
|---|---|---|---|
| 5,189,630 A | 2/1993 | Barstow et al. | |
| 5,355,161 A | 10/1994 | Bird et al. | |
| 6,003,073 A | 12/1999 | Solvason | |
| 6,018,768 A * | 1/2000 | Ullman et al. | 709/218 |
| 6,122,403 A | 9/2000 | Rhoads | |
| 6,240,459 B1 | 5/2001 | Roberts | |
| 6,370,513 B1 * | 4/2002 | Kolawa et al. | 705/10 |
| 6,411,725 B1 | 6/2002 | Rhoads | |
| 6,442,517 B1 | 8/2002 | Miller | |
| 6,505,160 B1 | 1/2003 | Levy et al. | |
| 6,522,769 B1 | 2/2003 | Rhoads et al. | |
| 6,614,914 B1 | 9/2003 | Rhoads et al. | |
| 6,642,966 B1 * | 11/2003 | Limaye | 348/473 |
| 6,947,571 B1 * | 9/2005 | Rhoads et al. | 382/100 |
| 6,973,669 B2 * | 12/2005 | Daniels | 725/112 |

(Continued)

FOREIGN PATENT DOCUMENTS

| | | |
|---|---|---|
| EP | 1204277 | 5/2002 |
| JP | 2002132634 | 5/2002 |

(Continued)

OTHER PUBLICATIONS

U.S. Appl. No. 09/571,422, filed May 15, 2000, Rhoads et al.

(Continued)

*Primary Examiner* — Brian Pendleton
*Assistant Examiner* — Ryan Stronczer
(74) *Attorney, Agent, or Firm* — Digimarc Corporation

(57) ABSTRACT

This disclosure describes methods and systems for synchronizing broadcast and network content, such as web content. It also describes related technology for facilitating linking from broadcast content to related information and e-commerce on a network. One method detailed in this disclosure synchronizes broadcast content with dynamic network content at a network address. This method embeds an identifier in a broadcast, extracts the identifier embedded in broadcast content, and uses the identifier to identify corresponding network content. The method then posts the corresponding network content on a network device located at the network address (e.g., a web page at the URL of the broadcaster). The network device (e.g., web server) is responsive to requests sent to the network address to provide the network content over a network. Using this method, the broadcast content is synchronized with the corresponding network content. This approach enables the content at the broadcaster's fixed web site URL to change dynamically with the broadcast. This approach is transparent to the user, who simply visits the same URL to get more information about current programming or purchase a product currently advertised in current programming.

23 Claims, 2 Drawing Sheets

U.S. PATENT DOCUMENTS

| | | |
|---|---|---|
| 7,228,280 B1 | 6/2007 | Scherf |
| 7,308,485 B2 | 12/2007 | Roberts |
| 2001/0055391 A1* | 12/2001 | Jacobs ......................... 380/241 |
| 2002/0049569 A1* | 4/2002 | Lenoir et al. .................. 702/189 |
| 2002/0140857 A1 | 10/2002 | Limaye et al. |
| 2002/0152388 A1* | 10/2002 | Linnartz et al. ............... 713/176 |
| 2002/0162118 A1 | 10/2002 | Levy et al. |
| 2002/0164053 A1* | 11/2002 | Seder et al. ................... 382/100 |
| 2002/0184646 A1* | 12/2002 | Lord ............................. 725/109 |
| 2003/0012403 A1* | 1/2003 | Rhoads et al. ................ 382/100 |
| 2003/0028882 A1 | 2/2003 | Davis et al. |
| 2003/0051252 A1 | 3/2003 | Miyaoku |
| 2004/0008846 A1* | 1/2004 | Medvinsky ................... 380/278 |
| 2004/0044576 A1* | 3/2004 | Kurihara et al. ............... 705/14 |
| 2004/0117831 A1* | 6/2004 | Ellis et al. ...................... 725/53 |
| 2004/0139474 A1* | 7/2004 | Carro ............................ 725/112 |
| 2005/0028189 A1* | 2/2005 | Heine et al. .................... 725/20 |
| 2005/0091683 A1* | 4/2005 | Sheynman et al. ............ 725/34 |
| 2006/0184960 A1* | 8/2006 | Horton et al. .................. 725/25 |
| 2007/0247278 A1 | 10/2007 | Petrovic |
| 2008/0062315 A1* | 3/2008 | Oostveen et al. ............. 348/500 |

FOREIGN PATENT DOCUMENTS

| | | |
|---|---|---|
| JP | 2002209204 | 7/2002 |
| JP | 2003203035 | 7/2003 |
| WO | WO00/70523 | 11/2000 |
| WO | WO01/15357 | 3/2001 |
| WO | WO03017135 | 2/2003 |
| WO | WO03017540 | 2/2003 |
| WO | WO2005089476 | 9/2005 |

OTHER PUBLICATIONS

U.S. Appl. No. 09/476,686, filed Dec. 30, 1999, Rhoads et al.
U.S. Appl. No. 09/660,756, filed Sep. 13, 2000, Levy.
Written Opinion of the International Searching Authority dated Mar. 26, 2007 in WO2005/089476.
Notice of Reasons for Rejection dated Feb. 2, 2011, in JP2007504140.
Notice of Reasons for Rejection dated Dec. 12, 2011, in JP2007504140.
Final Rejection dated May 9, 2012, in JP2007504140.

* cited by examiner

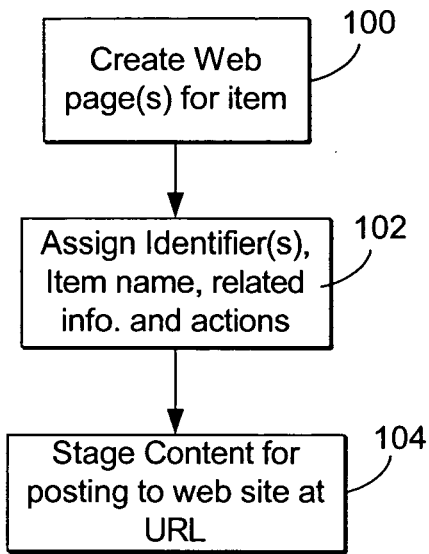
FIG. 2
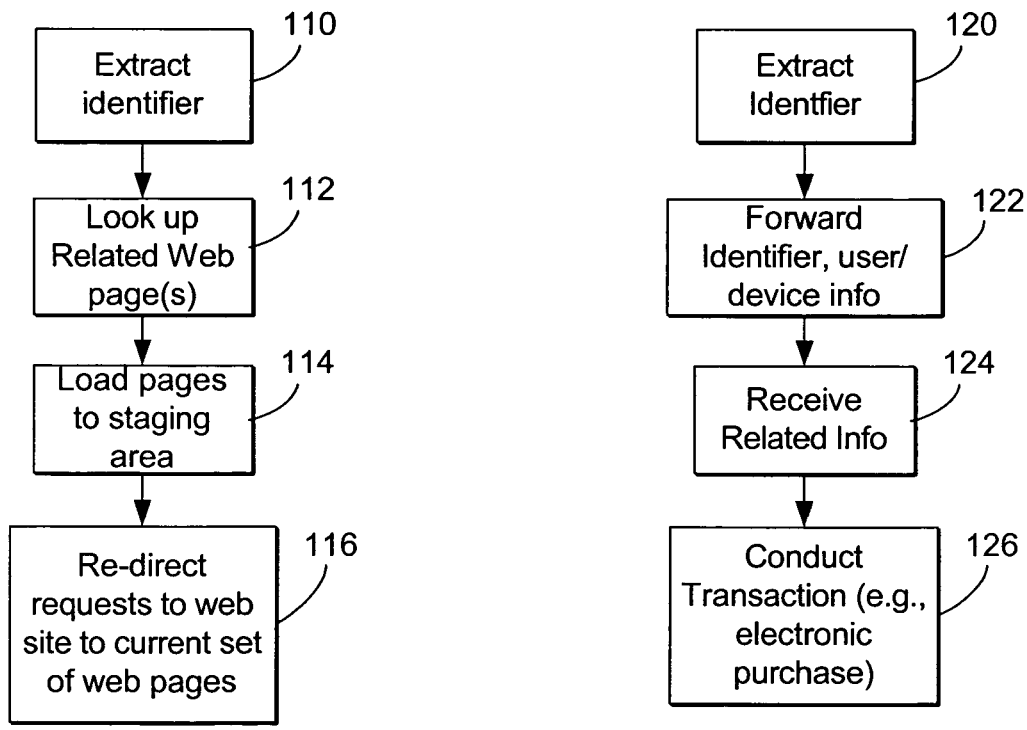
FIG. 3
FIG. 4

SYNCHRONIZING BROADCAST CONTENT WITH CORRESPONDING NETWORK CONTENT

TECHNICAL FIELD

The invention relates to systems and methods for synchronizing broadcast content with network content and for facilitating electronic transactions on a network in response to broadcast content.

BACKGROUND AND SUMMARY

The convergence of content distribution technologies like the Internet, TV, radio and wireless communications is creating new opportunities for consumers to interact with entertainment content from disparate sources. Television broadcasts, for example, prompt viewers to log on to web sites for content relating to current television programming. To enhance interactivity, some forms of broadcast programming carry links to web sites or other interactive features that enable viewers to order products and services. Assignees prior work in this field provides several innovative ways for associating various forms of multimedia content (broadcast, packaged or digitally distributed via network) with related information and services on digital networks. See, for example, U.S. Pat. Nos. 6,122,403, 6,505,160, 6,411,725, and 6,522,769, and U.S. patent application Ser. Nos. 09/476,686, 09/660,756, 10/060,049 (Published as 20020162118), and 09/571,422, which are hereby incorporated by reference.

Despite the advances in technology fueling the digital convergence, there remain a number of challenges in bringing together traditional broadcast media and Internet content in a user-friendly manner. One particular challenge is synchronizing broadcast content (such as radio or TV programming) with related Internet content on the World Wide Web. Often, it is difficult to integrate promising new technology with the existing infrastructure for broadcast content, so technologies that seem to offer effective convergence of television, radio and Internet entertainment get little traction in the marketplace. To enhance programming like home shopping, game shows, sports etc., broadcasters attempt to present dynamic content on their web sites corresponding to programming in their broadcasts. The conventional way for the broadcaster's audience to get to the appropriate web site is to visit a well-known URL for the web site, such as the front page (e.g. www.shopping.com) rather than having to remember different URLs for different programming topics from the same source, or navigating through a confusing array of web links to find the topic of interest. At the same time, the web site provider would like the user to see content that changes with the broadcast, so that the programming and related web content has the maximum impact for the provider and appears timely and easy to access to the consumer. This is particularly true for e-commerce applications, where the provider is trying to promote products or services. An example of this case is home shopping networks that want to use the broadcast content to drive consumers to purchase products at the broadcaster's web site. This usage model from the consumer's perspective, yet the content at that web site is dynamic.

This disclosure describes methods and systems for synchronizing broadcast and network content, and in particular, synchronizing TV or radio broadcasts with dynamic web content at a web site. It also describes related technology for facilitating linking from broadcast content to related information and e-commerce transactions on a network, including working with a remote portable device, such as a cell phone.

One method detailed in this disclosure synchronizes broadcast content with dynamic network content at a network address. This method extracts an identifier embedded in broadcast content, and uses the identifier to identify corresponding network content. The method then posts the corresponding network content on a network device located at the network address (e.g., a web page at the URL of the broadcaster). The network device (e.g., web server) is responsive to requests sent to the network address to provide the network content over a network. Using this method, the broadcast content is synchronized with the corresponding network content.

This approach enables the content at the broadcaster's fixed web site URL to change dynamically with the broadcast. This approach is transparent to the user, who simply visits the same URL to get more information about current programming or purchase a product currently advertised in current programming as it is aired. The process also has limited effect on workflow for the broadcaster, which is optimal.

Further features will become apparent with reference to the following detailed description and accompanying drawings.

BRIEF DESCRIPTION OF THE DRAWINGS

FIG. 2 is a flow diagram illustrating a method for associating identifiers with network content to synchronize posting of dynamic network content with a broadcast and to facilitate linking between user devices and network information and services in response to the broadcast.

FIG. 3 is a flow diagram illustrating a process for using web content identifiers in broadcast content to synchronize content at a web site with the broadcast content.

FIG. 4 is a flow diagram illustrating a process for facilitating linking between user devices and network information or services in response to detecting identifiers embedded in the broadcast.

DETAILED DESCRIPTION

Figure 1:
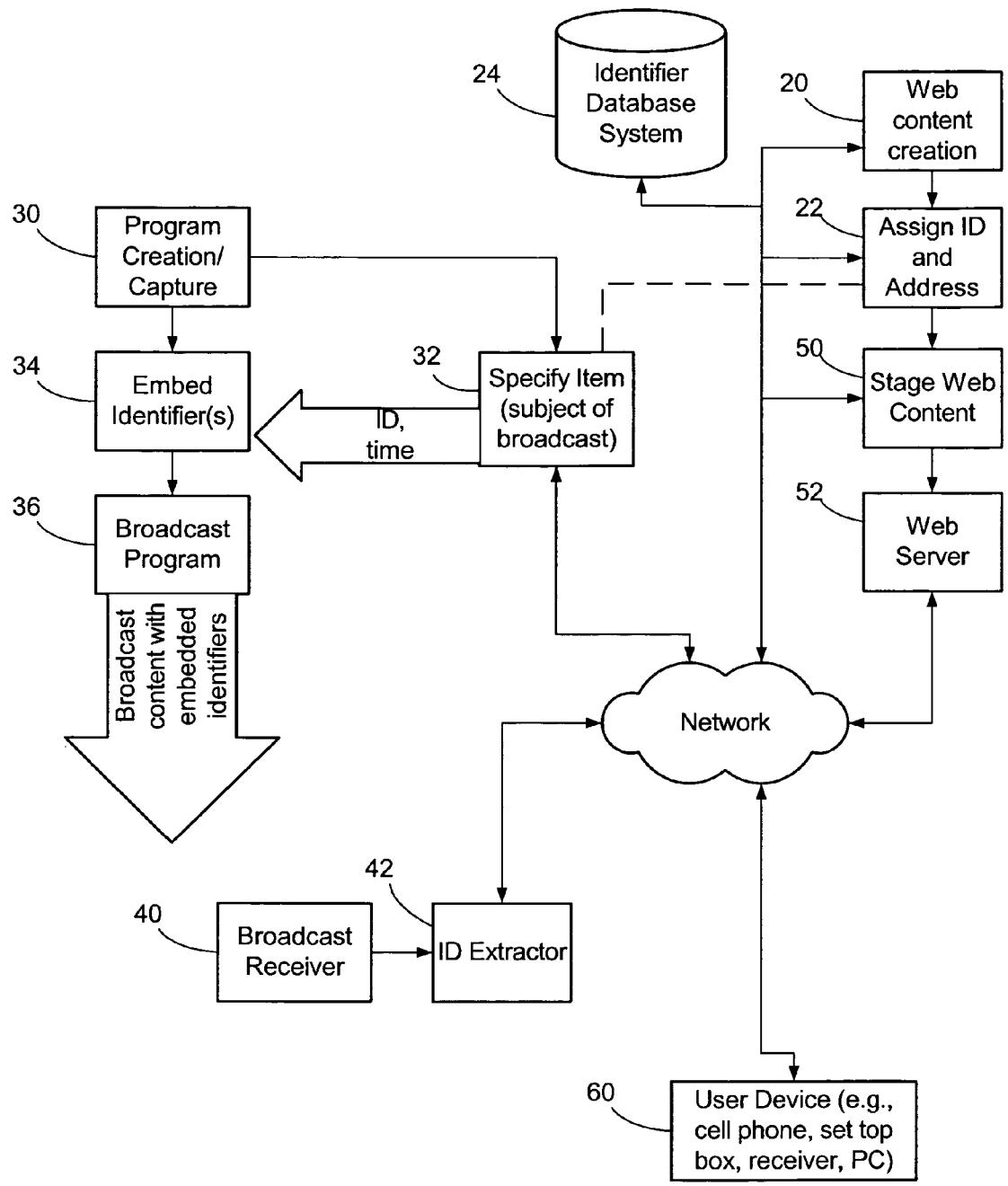
FIG. 1 is a diagram illustrating a system for synchronizing broadcast and network content.

FIG. 1 is a diagram illustrating a system for synchronizing broadcast and network content. While the specific network architecture varies with the implementation, this particular diagram focuses on the case where the network uses Internet protocols. In this case, the network content refers to web content, such as sets of web pages including HTML code, scripts, and other web programming instruction and content. To further aid in illustrating the system, we use the example of a home shopping network, where the broadcaster wishes to synchronize live home shopping programs promoting products or services with web content that provides more information about and opportunities to buy these products and services as they are aired.

The system of FIG. 1 has the following four components:
1. Web page creation and identifier assignment system;
2. Broadcast production system;
3. Web page staging, serving and synchronization system; and
4. System for facilitating linking from broadcast to network information and services.

Web Page Creation and Identifier Assignment System

The web page creation system includes a component for web page creation 20, such as a web-authoring tool on a computer. This component creates web pages that are specifically tailored for topics that will be the subject of broadcast programming. For example, for home shopping programs, the web pages provide descriptions and e-commerce forms for selling items that are the subject of the programs as they are broadcast.

The system also includes a component for assigning network content identifiers (IDs) and associated address information 22 to sets of web content. This component interfaces with an identifier database system 24 that stores the associations between the network content identifier, the set of web content, the associated item name (e.g., topic description, subject of web page, product name, service name, etc.), and the address where the content is stored. This address may be in the form of a URL, pointer, index, or other type of reference to a network storage location where the set of web content is located. One example of the ID assignment and database system is an asset management system in which the relationships among the web content, identifiers and related information are stored in relational database table structures. This structure enables other devices and users to query the system with an item name (e.g., topic) and get one or more sets of related web content and their identifiers. Similarly, devices can query the system with a web content identifier to get its address.

Each set of web content may comprise one or more web pages. The set may be assigned more than one identifier, each associating the content with different information or actions. For example, a first identifier may be used solely to synchronize the posting of the set of web content with a broadcast. A second identifier may be embedded in the broadcast content along with the first to trigger certain types of e-commerce operations, such as linking a user device (e.g., cell phone, set top box, receiver, PDA or PC) to network information about a program or product depicted in the program, or to link directly to an e-commerce form to buy a product. The functions of the first and second identifiers may be performed with one identifier. The identifier(s) may be embedded in a digital watermark in the broadcast content (or conveyed through an alternative in-band or out of band carrier). One identifier may index to a database entry with other identifiers, and in this manner, several layers of indirection and dynamic linking may be employed to associate a single identifier with other identifiers, and so on. Each identifier, in turn, can be used to fetch particular web content as well as different system responses depending on the device, user, time, programming, location, language or other context information. The two identifiers may have different aspects, since the second identifier may need to survive the rendering process if the mobile device picks up the content after rendering, such as taking a picture of the video with a cell phone camera or recording audio with a cell phone microphone. In the one identifier case, it may be robust enough for the broadcast and rendering process. (If the mobile receiver has a tuner, the identifier does not need to survive rendering, only broadcast as in the web synchronization case.)

FIG. 2 is a flow diagram illustrating a method for creating network content and associating identifiers with the content. This method creates a database that is used to synchronize web posting activity with a broadcast. As explained later, the database can also be used to facilitate linking between user devices and network information or services in response to the broadcast.

In step 100, web pages are created for items that will be the subject of broadcast programs. These programs may be live programs that have not yet aired, or pre-recorded programs, or segments of a live broadcast. For live programming, the items to be showcased on the web site are known ahead of time, but the precise timing and order in which these items will be showcased in the live broadcast are not known. In this case, web content is prepared in anticipation of the expected topics or subjects of the live broadcast, and is dynamically selected at the time of the broadcast based on a specification of the topics or subjects during broadcast production.

Next in step 102, identifier(s) are assigned to corresponding sets of web content as explained above. To facilitate dynamic assignment of web content to a live broadcast, the assignment phase establishes a rich set of descriptors for the web content that enable the broadcasters to quickly index the web content at the time of the broadcast. These descriptors may include key words, product or service names, actors, scene names, etc. that are readily identifiable at the time of broadcast.

Finally, the prepared web content is staged for posting to the broadcaster's web site at a specified URL. This staging can be performed by creating and storing different sets of web pages representing alternative versions of a web site and posting them to a staging memory location, where they can be quickly uploaded to or swapped into a "web site" by re-directing requests for the web site home page (e.g., a fixed, well known URL, like a domain name) to a desired web page in a staging memory location. These staging locations may be mirrored, and/or distributed over two or more servers or staging memory locations. This staging can be performed in advance, or in response to monitoring of the broadcast for embedded web content identifiers, which trigger the placement of content in staging locations and/or the preparation of updated re-direction tables to direct requests for the home page to the appropriate locations in the staging memory.

Alternatively, the front page may include an image and/or short description of the item currently being discussed on live TV, and this information is linked to the full web page for that item, which is deeper in the web site.

Broadcast Production System

The broadcast production system manages the creation of the broadcast content, the embedding of identifiers into the content, and the broadcast of the content. This system is sufficiently general to encompass a variety of forms of broadcasting and media content types, including TV (cable, satellite, over the air), and radio (satellite or over the air), as well as various formats of video and audio programming transmitted over these broadcast channels. Identifiers may be embedded in the video track or audio track of video programming, or in the audio signal of audio programming.

In this example, the program creation system 30 includes equipment to capture live performances as well as real time assembly of pre-recorded content into a program for broadcast. For example, in the case of the home shopping channel, products are promoted with live performances captured via video cameras, and occasionally assembled with portions of pre-recorded material.

The system includes a topic identifier component 32 for specifying subjects of the broadcast. The items that are the subject of the broadcast (e.g., products, services, discussion topics, people, etc.) may be identified automatically or manually by studio technicians. Some schemes for automatic identification include digital watermarks or other machine readable cues on the products, sets, or inserted by cameras or other recording equipment (e.g., watermark embedder in the camera or audio recorder is used to label the video or audio stream), as well as machine recognition of objects, faces or voices. In this case, the topic identifier component automatically detects the subject from the video or audio content. For example, a digital watermark detector extracts a watermark from the video or audio stream that provides an item identifier of the item portrayed in the video or audio stream.

The table that is used in component 32 may be obtained through the network or transported in other ways from the web creation side to the broadcast side (e.g., the dashed line linking boxes 32 and 22). A simple example embodiment of the table is:

| Item | Content ID | Staging address/file name |
| --- | --- | --- |

For manual identification of the subject, the system includes a user input device, such as personal computer or PDA that enables rapid entry of item names (including topics, people names, places, scenes, games, players, etc.), IDs, or particular web content addresses. The input device could have a simple drop down menu that lists the items.

Alternatively, the operator may simply have a spreadsheet, either as a digital file or printed, and enter the correct ID directly to the embedder or controller for the embedder.

The example shown in FIG. 1 depicts the topic identifier component 30 for specifying the subject of the broadcast as being in a networked configuration with the database system 24. This is just one possible example of how these parts of the system can interoperate. These parts may be at the same location or remote to each other and communicate through a wide area network, such as the Internet.

The asset management system facilitates rapid retrieval of the web content identifiers to be embedded in the broadcast program. For example, the technician can type in a query based on the item name, and the asset management system will return one or more choices of related web content and the associated web content identifiers. The user can then select the appropriate content based on its descriptors, and in response, the computer instructs an embedder 34 to embed the web content identifiers in the video or audio stream at times synchronized with the appearance of the items in the broadcast program. A lead time may be provided to enable sufficient time for the web server to synchronize the web content. This can be achieved by placing a slight delay on the broadcast and inserting the identifiers in content in advance of when the corresponding items actually appear.

Broadcast equipment 36 then broadcasts the program with identifiers.

In the case where pre-recorded content is mixed with the live broadcast, this content can be embedded with identifiers ahead of time in a similar manner as described for live broadcasts.

Web Page Staging, Serving and Synchronization System

FIG. 1 illustrates the components of a web page staging, serving and synchronization system. FIG. 3 is a flow diagram illustrating a process for using web content identifiers in broadcast content to synchronize content at a web site with the broadcast content. In this section, we discuss synchronization systems and methods in connection with these diagrams.

The synchronization system includes a broadcast receiver 40 and ID extractor 42. The receiver is tuned to the broadcast and captures the stream of content (audio or video) in which the web content identifiers are embedded. As shown in step 110, the ID extractor extracts the embedded identifiers from the received program. The extractor is compatible with the technology used to embed the ID, such as a digital watermark, or other embedded identifier. In particular, the extractor may include one or more digital watermark decoders that extract embedded data that has been embedded with different keys and/or pseudo-random transform functions that make each watermark relatively independent of other watermarks in the content. The digital watermarks can also carry explicit timing information as part of their message payloads, or convey implicit timing information based on their location and pattern of appearance in time or spatial coordinates of the content.

While the synchronization system in FIG. 1 is shown to communicate with the database and other components via a network, this type of configuration is not required.

The synchronization system also includes a web content staging system 50 that manages loading and freeing of web content from a staging memory, and a web server 52 that manages requests to a web site and returns web page content for that web site.

As shown in step 112, the extracted identifier is used to look up related web content. In the system of FIG. 1, the ID extractor queries the database 24, which provides the information needed to identify and stage the corresponding web content to the staging system and server (50, 52). This information may simply be an address of a desired set of web content. In this case, the web content staging system 50 places the identified web content in the staging memory, if it is not already there, as shown in step 114. The re-direction tables in the web server 50 are updated so that the home page URL points to the desired set of web content in the staging memory as shown in step 116. Alternatively, the desired web content is uploaded to the web site (e.g., replacing existing content, which becomes obsolete). Preferably, the web site content is mirrored over several locations and appropriate load balancing is used to make a switch to new web content transparent (e.g., without significant interruption of service). As explained above, this can be accomplished is by preparing the new version of the web site in a staging area of memory just before the update is desired. Then when the web site becomes live at a time triggered by an embedded flag (or other trigger) in the broadcast or operator input, the web server re-directs web page requests for the home page to the location of the new version of the web site.

As an alternative to this automated process for dynamically updating the web site content, the ID extractor can send a warning message to the web site operator, informing the operator that the web site content should be re-directed to a particular set of content or address at a particular time. (E.g., the identifier can be used to notify a network operator that network content is not properly synchronized with broadcast content.) The web site operator can then set up the changes to the re-direction tables after the new content has been fully staged and mirrored to enable peak web site requests when the new web site becomes live.

The web pages themselves may also be embedded with links (such as conveyed in digital watermarks as described in U.S. Pat. No. 6,122,403), so as to link to other web pages that form part of a set of web pages to be staged for a particular broadcast. These embedded links can also be dynamic (e.g., point to a database storing updateable addresses of new pages as new versions of content are created over time). One example is where each set of web pages for a web site has a "home page" with embedded links that dynamically link the other web pages in the set to that home page. With this approach, each of the different web site versions can be updated by creating new pages, storing them at specified addresses, and then updating the linking table for each home page to link the home page to the addresses of the new pages in the set.

Additionally, the images on the web site may be embedded with the same content ID included in the broadcast. This enables a second verification that the content on the web site is correct. Thus, verification can occur based upon both the content and its network address linked to the content ID.

System for Facilitating Linking From Broadcast to Network Information and Services An added benefit of the system shown in FIG. 1 is that the embedded identifiers can also act as links from the broadcast content to network information and services. As detailed in assignees patents and patent applications referenced above, the embedded identifiers transform the broadcast content into a portal to network information and services. In the case where the identifiers include robust digital watermarks or fingerprints, the identifiers can be extracted from a received signal provided by a tuner (e.g., TV or radio tuner) or from ambient audio or video rendered by another device and captured by a microphone or camera.

There is synergy between the synchronization system and the infrastructure needed to support linking from content to networks. The process of setting up the synchronization system already produces compelling web content and associates it with a broadcast and related products or services. Therefore, the same or similar database structures can be used to receive extracted identifiers and serve related network information.

FIG. 4 is a flow diagram illustrating a process for facilitating linking between user devices and network information or services in response to detecting identifiers embedded in the broadcast. To describe this process, we continue our example of the home shopping channel. In this usage scenario, the user has a device that receives audio or video from the broadcast and initiates the process of linking that audio or video to related information using extracted identifiers. Some examples of devices include a cell phone, PDA, personal computer, set top box, etc. with a microphone for capturing audio of the broadcast (rendered by a TV or other device), or a tuner for receiving the broadcast from over the air.

Once the signal is captured by tuner, microphone or other capture device, the system has at least a portion of the broadcast program in a form from which the identifiers can be extracted as shown in step 120. The extraction can be performed on the capture device or it can be performed on some other device (such as a server) in the system to which the signal is forwarded. As shown in step 122, the extracted identifier is forwarded to a database for looking up the appropriate action. The identifier may be forwarded along with user and device information, such as a device ID, device format, account number, GPS coordinates, time, user preferences, etc. to assist in customizing the format of the response to the user and device, and to facilitate e-commerce transactions in connection with the user's account number. For example in the case where the device is a cell phone interacting with a home shopping program, the cell phone can provide the user's ID and/or account information (or index to this information stored in a secure registry).

In response, the system looks up the web page relating to the product portrayed in the program, and generates a web form partially populated with the user's information, enabling the user to buy the product with a push of a button on the cell phone. The user receives this form and/or other information, web links, etc. on the device, as shown in step 124. Preferably, this information is formatted for the user's device (cell phone display vs. PC display vs. TV-set-top box display). The user may choose to complete the transaction (e.g., select a "buy now" option), link to other information via displayed web links returned in the web page (e.g., select a "learn more" option), or do nothing.

In response to the user's choice to buy the product, the system conducts the transaction as shown in step 126. In particular, the system validates that the electronic form returned by the user's device is complete and the user's account is valid, and then processes the order. The product, if a tangible item, can then be shipped to the user's billing or shipping address automatically, and the user's cell phone account (or other debit or credit account) can be charged for the product. For electronic products, like music and other entertainment content, the products can be distributed electronically to the user's device, e-mail box, media library, home computer, etc.

In above description, we used the specific example of a cell phone interacting with home shopping program. However, as demonstrated in assignee's incorporated patents and patent applications, the linking and response scenarios are almost limitless. One could perform similar transactions via a remote control and set top box system, or via personal computer.

Background on Digital Watermarking

As noted above, one form of embedded identifier is a digital watermark. Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the identifier encoding processes may be implemented in a programmable computer or a special purpose digital circuit. Similarly, identifier extracting may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of synchronizing broadcast content with dynamic network content at a network address, the method comprising:
extracting an identifier embedded in broadcast content;
using the identifier to identify corresponding network content; and
after the corresponding network content thereby has been identified, posting the corresponding network content on a network device located at the network address, the network device being responsive to requests sent to the network address to provide the network content over a network; wherein the broadcast content is synchronized with the corresponding network content.

2. The method of claim 1 wherein the broadcast content comprises a video program, and the identifier is embedded in the video program.

3. The method of claim 2 wherein the identifier is embedded in a video track of the video program with a video watermark that modifies frames of video data to encode the identifier in the video frames in a substantially imperceptible manner.

4. The method of claim 2 wherein the identifier is embedded in an audio track of the video program with an audio watermark that modifies an audio signal to encode the identifier in the audio signal in a substantially imperceptible manner.

5. The method of claim 1 wherein the identifier triggers automatic posting of the corresponding network content.

6. The method of claim 1 wherein the dynamic network content comprises sets of HTML content, each set corresponding to a particular item, each set being prepared prior to broadcast of programs relating to the particular items.

7. The method of claim 6 wherein the particular items comprise products or services, and the programs comprise shopping programs that are broadcast to sell the products or services.

8. The method of claim 6 wherein the broadcast of the programs are live broadcasts, and the identifiers are embedded in the live broadcasts to synchronize the live broadcasts with dynamic HTML content accessible at the network address.

9. The method of claim 1 wherein the broadcast content comprises a radio broadcast.

10. The method of claim 9 wherein the broadcast content comprises a satellite radio broadcast.

11. The method of claim 1 wherein the identifiers enable synchronizing of dynamic network content accessed by users at a single URL with broadcast content, and also provide a link to network information about the broadcast content.

12. The method of claim 11 wherein the link is used to return content relating to the broadcast to a user's device in response to a request from the user.

13. The method of claim 12 wherein the content returned to the user's device enables the user to conduct an electronic transaction relating to the program.

14. The method of claim 13 wherein the electronic transaction comprises an electronic order to purchase an item that is advertised in the program.

15. The method of claim 12 wherein the request from the user is generated in part based on extracting the identifier from the broadcast content.

16. The method of claim 15 wherein the extracting of the identifier used to generate the request is performed on the user's device.

17. The method of claim 16 wherein the user's device is a cell phone.

18. The method of claim 12 wherein the user's device includes a process for extracting identifiers embedded in broadcast content received on the user's device.

19. The method of claim 18 wherein the process for extracting identifiers comprises a digital watermark decoding process for extracting digital data that is substantially imperceptibly embedded in audio or video signals of broadcast programs.

20. The method of claim 12 wherein the user's device provides information about the user's device to enable information returned to the user to be customized to the user's device.

21. The method of claim 12 wherein the user's device provides information about the user to enable information returned to the user to be customized to the user.

22. The method of claim 21 wherein the information about the user provides an account number to facilitate electronic transactions on the device relating to the broadcast content.

23. The method of claim 1 wherein the identifier is used to notify a network operator that network content is not properly synchronized with the broadcast content.

* * * * *